Indig et al.

[11] 3,845,294

[45] Oct. 29, 1974

[54] MULTIPLEXED COMMUNICATIONS SYSTEM

[75] Inventors: George Sanford Indig, Bernards Township, Somerset County; Peter Michael Rentzepis, Millington, both of N.J.

[73] Assignee: Bell Telephone Laboratories, Incorporated, Murray Hill, N.J.

[22] Filed: May 9, 1973

[21] Appl. No.: 358,732

[52] U.S. Cl. .............................. 250/199, 350/162 R
[51] Int. Cl. .............................................. H04b 9/00
[58] Field of Search ... 250/199; 350/162 R, 162 SF, 350/169

[56] References Cited

UNITED STATES PATENTS 3,506,834 4/1970 Buschsbaum ........................ 250/199
3,755,676 8/1973 Kinsel ................................. 250/199

*Primary Examiner*—Albert J. Mayer
*Attorney, Agent, or Firm*—G. S. Indig

[57] ABSTRACT

A pulsed optical communication system based on use of a pulse train generated, for example, by a Q-switched laser, is frequency multiplexed so as to contain generally upwards of 10 subchannels. Subchannels correspond with frequency spectral portions representative of natural laser modes and are processed by first separating the spectral content of a pulse envelope, for example, by use of a prism, and then modulating such portions individually. Modulation may take any of the usual forms—either quantized or analog. In the usual system, component pulses are reconstituted after modulation perhaps by introduction into a transmission line. Demultiplexing is accomplished by a similar procedure, i.e., by separating spectral components within a pulse envelope and by introducing such components into photomultipliers or other suitable detectors.

13 Claims, 1 Drawing Figure

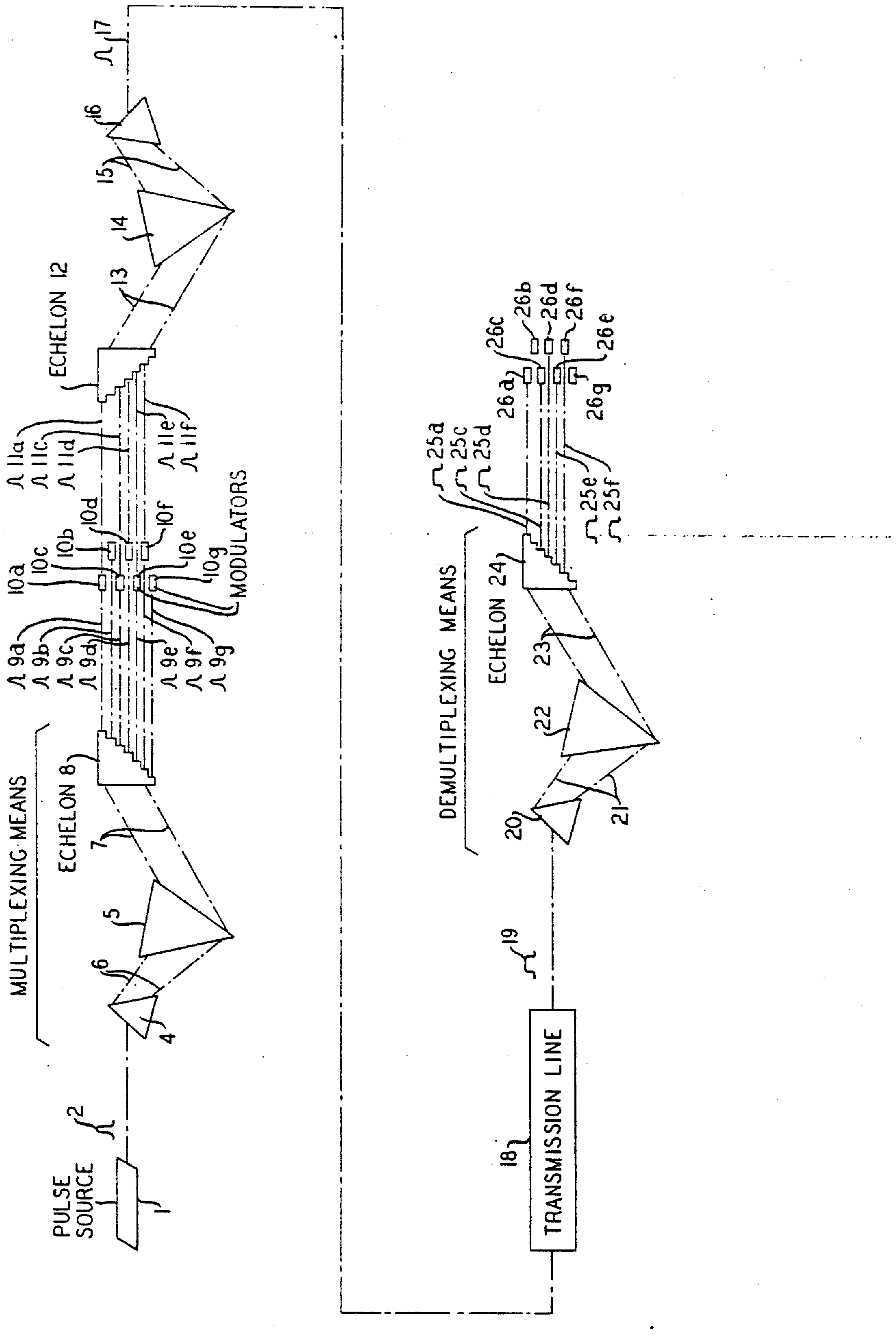
PULSE SOURCE
MULTIPLEXING MEANS
ECHELON 8
ECHELON 12
MODULATORS
TRANSMISSION LINE
DEMULTIPLEXING MEANS
ECHELON 24

MULTIPLEXED COMMUNICATIONS SYSTEM

BACKGROUND OF THE INVENTION

1. Field of the Invention

The invention is concerned with multiplexed pulsed optical communications systems.

2. Description of the Prior Art

Development of the laser oscillator was, at its inception, recognized for its communications significance by workers all over the world. High center frequency carried with it the implicit suggestion of broad bandwidth capability.

The years since the announcement of the laser have seen considerable development in the many circuit components useful for optical communications. Accordingly, electrooptic, acoustooptic, and magnetooptic interactions, to name a few, have been utilized in the design and demonstration of such diverse elements as modulators, isolators, deflectors, etc. Frequency shifting elements have also received considerable attention and use has been made of non-linear materials in second harmonic generators, third harmonic generators, and parametric oscillators. There have also been significant developments in the detector field. Sensitivity has been improved for semiconductor detectors, for photomultipliers, and for bolometers. Of particular significance in this connection is the demonstrated ability of a pyroelectric detector to follow unexpectedly high modulation frequencies on infrared and shorter wavelength carriers.

The element slowest to develop has been the transmission line. Studies have been conducted on a variety of materials in the gaseous, liquid, and solid state. Glass media are perhaps closest to commercial fruition at this time; and silica or modified silica lines having insertion losses of 2 or 3 dB/kilometer have been fabricated. Such lines representative of lines constructed of any real media have dispersive characteristics. That is, the velocity for radiation of differing wavelengths is different. Typical glass transmission lines evidencing a dispersion of the order of five percent over the extremities of the visible spectrum thereby impose a dispersion limit which corresponds with a pulse repetition rate of megabits per second for feasible repeater intervals.

SUMMARY OF THE INVENTION

In accordance with the invention, the effective bandwidth of an optical transmission system is increased by a form of frequency multiplexing. In essence, spectral components within a pulse envelope in excess of those required to Fourier-define the envelope are treated as subchannels or subcarriers, are individually modulated, are reconstituted, transmitted, and demultiplexed at the receiving end. The system inherently permits pulse sharpening at repeater locations and may therefore permit the added advantage of lessening the limitation imposed by dispersion.

Pulsed information which may be processed in accordance with the inventive systems, may have center frequencies lying within or without the visible spectrum—in short, may be of any frequency which may be processed by use of optical elements. Pulses may be produced in a variety of ways, for example, by use of Q-switched or mode-locked lasers, or by periodic interruption of a cw stream. Pulse duration and interpulse spacing are parameters of primary concern to the design engineer and impose no intrinsic limitation on the systems.

The primary fundamental requirement for the pulsed radiation to be processed is that it contains wavelength modes in excess of those required to meet the Fourier requirements for the pulse envelope. Typically, this is an inherent characteristic of pulses as generally produced so that, for example, pulses of the order of 1,000 wave numbers in frequency width as produced by a Q-switched laser may be expected to contain of the order of from 10 to 100 wavelength components available for use as subchannels.

In the usual embodiment in accordance with the invention, subchannels are separated by first passing the total pulse through a wavelength spreading component, such as a prism or grating; by then imposing a modulator of such aperture and in such position as to accept only the "subchannel" of interest; and finally by reconstituting a total pulse as modulated, perhaps by use of prisms or gratings, or simply by introduction into a transmission line.

BRIEF DESCRIPTION OF THE DRAWING

The FIGURE is a schematic representation of a communications system in accordance with the invention.

DETAILED DESCRIPTION

1. Terminology

Terms utilized in this description are sometimes used in a representative sense and should be interpreted broadly. Such terms are defined:

Pulse Source: is apparatus for producing one or a series of pulses of appropriate center frequency and other characteristics. At this time such a source would likely include a laser oscillator which may be cw or pulsed, e.g., Q-switched, or mode-locked. The source may include other elements, for example, a pulse multiplier to create a pulse train out of a single pulse or to lessen interpulse intervals; it may include an element designed to alter the center frequency or to introduce other spectral components. It may include a dispersive medium to increase spectral components.

Initial Pulse: has reference to a pulse or any member of a pulse stream produced by the pulse source. As indicated, its spectral content exceeds that required to Fourier define the envelope.

Multiplexing Means: refers to the apparatus utilized for separating frequency components within the pulse envelope in a spatial sense so that they may be separately processed. Typical multiplexing means includes a prism or grating for spreading the envelope contents according to wavelength but may additionally include means for focusing, for collimating, and for quantizing the spectral components which constitute the subcarriers. In the usual instance in which a pulse envelope is characterized by frequency "spiking" corresponding to identifiable laser frequency modes, the maximum number of channels and also the specifics of any manner of quantizing are specified by such modes.

Component Pulses: refer to the subcarriers, in turn, corresponding with separated frequency components or spectra. While it is convenient to refer to energy at this stage in these terms it should be understood that the terminology does not preclude a continuous wave front representative of a varying wavelength in a direction transverse to the transmission direction. In this sense, therefore, component pulses are not necessarily actually separated one from another. The terminology is, nevertheless, considered appropriate, since such components are of short or pulse duration and so may be considered as constituting "pulses" at least in the dimension defined by the transmission direction.

Modulator: is an element for somehow modifying the nature of a component pulse. It may be utilized to impose intelligence information in the conventional sense, corresponding with, for example, voice or other signal within the audible range or it may correspond with data, pictorial or other information. Alternatively, the modulator may produce a variation in the component pulse simply by the nature of its intrinsic characteristics. Accordingly, modulation may come about from the absorption state of the "modulator" which may serve to identify the nature of the modulator or which may be interrelated with other properties. Modulation may be quantized (binary or higher order) or may be analog. Interactions serving as useful mechanisms of an operation of a modulator include, for example, electrooptic, magnetooptic, and acoustooptic.

Reconstituted Pulse: refers to the pulse reconstituted from the now modulated component pulses. It is not required that such reconstituted pulse be of a time approximating that of the initial pulse. Reconstitution may result simply from simultaneous or sequential introduction of component pulses into the transmission line or from use of separate elements.

Transmission Medium: is the medium through which the reconstituted pulse is transmitted. This medium may be dispersive or non-dispersive; in the former case may constitute a glass line with or without cladding designed for single mode or multimode operation. Alternatively, it may be gaseous, or liquid, or even vacuum.

Demultiplexer: refers to the apparatus utilized for separating the reconstituted pulse anew into component pulses. This apparatus may resemble the multiplexing apparatus but it is not necessary that separation be of precisely the same magnitude. In general, where transmission line is of a real—that is, of a dispersive medium—it may be desired that the degree of wavelength spreading be somewhat greater so as to permit sampling which, while at the same center frequencies corresponding with the frequency modal position of the original component pulses, is of reduced spectral width. In this manner, the effect of dispersion as a limitation on bandwidth capability introduced by the line is minimized.

Detector: refers to elements corresponding in position to the modulators of such aperture and so positioned as to sense component pulses. Detectors may, for example, be photomultipliers, semiconductor devices, or may operate on a pyroelectric principle.

2. Operating Limits and Characterizations a. The initial pulse has been generally characterized. Accordingly, it must not be single mode. That is, it must have sufficient frequency components to permit sampling of frequency spectral width less than that defining the envelope. In actual practice, satisfying this condition is no problem; and laser pulses with pulse widths perhaps hundreds or a thousand wave numbers wide may be expected to contain 20 or more frequency components available for use as subcarriers.

Even pulses which are theoretically Fourier-limited may, under certain circumstances, be used; so, for example, they may deliberately be passed through a dispersive medium—dispersion resulting in broadening by a factor of 10 results in a minimum of 100 available wavelength components in accordance with the Fourier relationship $$y = a_0 + a_1 \sin \omega t + a_2 \sin 2\omega t + a_3 \sin 3\omega t + \ldots + a_1' \cos \omega t + a_2' \cos 2\omega t + a_3' \cos 3\omega t + \quad (1)$$

where $a_0$ is a constant, $a_1, a_2 \ldots a_1', a_2'$ are amplitudes $\omega$, $2\omega$, $3\omega$ are frequencies.

Alternatively, it is possible to introduce additional frequency wavelength components, for example, by passage through a medium resulting in some frequency conversion —e.g., a non-linear element such as a parametric oscillator or possibly a high Raman coefficient medium. See copending application, Ser. No. 358,734 filed May 9, 1973. (Jones—Rentzepis case 2-18).

Other requirements are generally set in view of other elements, particularly the transmission medium. For glass delay lines of the order of 10 to 100 mils in diameter, peak powers of the order of 1 GW are tolerable, and powers as low as a few milliwatts are sufficient. In the extreme, the upper limit should be set, such as, to avoid significant self-focusing and destructive effects, such as, due to heating. Interpulse spacing may also be a parameter of concern. Where transmission lines of real material are utilized, and therefore dispersion is a limitation, interpulse spacing must be set below some value depending upon economical or otherwise tolerable repeater spacing intervals. Spacing should be such that substantial coalescence of sequential spectral portions corresponding with a given subchannel in adjoining pulses does not take place. Assuming three $cm^{-1}$ subchannel spectral width; assuming tolerable repeater spacing of the order of 10 kilometers; and for a glass line evidencing a five percent dispersion over the visible spectrum, interpulse spacings of approximately 0.1 nanosecond are indicated.

Center frequency of the initial pulse may be of practical consequence depending upon the nature of the transmission medium. It is well known that scattering losses (and attendant absorption) decrease with increasing wavelength. Barring other influences, such as anomolous absorptions due, for example, to presence of hydroxyl radicals lowest scattering in glass lines generally occurs at near infrared wavelengths. From this standpoint, it may be desirable to operate with pulses generated by infrared lasers, such as those dependent upon trivalent neodymium or to otherwise convert pulse center frequencies to this range. Other considerations, on the other hand, may dictate shorter wavelength, as, for example, to match the transparency spectral range of elements including the transmission line, or in the manner of the copending application noted, to introduce a maximum number of wavelength components within a given pulse envelope through a Raman-Stokes conversion medium.

Systems of the invention are "optical" i.e., a substantial part of the energy of the initial pulse may be processed by optical elements, e.g., may be dispersed by a prism — i.e., wavelengths from 500$\mu$m to 100 Angstrom units.

b.) Other elements perform conventional functions and must meet design parameters characteristic of this system. Apertures of modulators or detectors, as well as design of any elements designed to segment total energy into component pulses must be such as to correspond in position and acceptance angle with desired component pulses. Prisms or gratings must have sufficient resolution to permit adequate separation of component pulses, etc. Other requirements, for example, having to do with signal-to-noise ratio at various stages in the system, are common to other systems and need not be discussed here.

THE DRAWING

The FIGURE is illustrative of an arrangement suitable for use as an inventive system herein. Depicted are pulse source 1 which likely includes a laser oscillator and may additionally include such ancillary apparatus as is desired to shift center frequency to vary spectral content, to alter pulse length, to create a pulse stream from a cw beam, etc. A pulse depicted 2 is schematically representative of energy emanating from pulse source 1.

The next function in the inventive system is served by multiplexing means. It is designed to separate pulse 2 into component pulses—i.e., pulses or wave front portions of distinct spectral content sometimes corresponding with natural wavelength modes produced by pulse source 1. The particular multiplexing means shown consists of a spreading element 4 which may take the form of a prism or grating but which for simplicity is referred to hereafter as a prism resulting in a spreading pulse front schematically depicted by diverging broken lines 6. Reversed prism 5 is included as illustrating a procedure for collimating the front. Resulting front 7 is then introduced into element 8. Element 8 may take the form shown schematically, which is that of an echelon inherently resulting in phase separation of component pulses, or it may segment the now spectrally spread pulse by means of a bundle of transparent fibers of the same or varying length. Phase separation may be desirable to permit more expedient physical placement of modulators. For the purpose of the depicted system, component pulses are depicted as 9*a*–9*g*. Such pulses are made incident on modulators 10*a*–10*g* which, again, for pedagogical purposes, are considered as operating in binary fashion with modulators 10*b* and 10*g* shown as blocking passage of corresponding pulses 9*b* and 9*g*. Exiting pulses 11*a* and 11*c*–11*f* are next reconstituted, illustratively by means of a reverse arrangement of elements, here depicted as: echelon 12, resulting in collimated pulse 13; prism 14, resulting in converging pulse 15 and prism 16 finally resulting in collimated, reconstituted pulse 17. Compacting of the pulse may result by sensing of narrowed spectral portions, for example, by limiting aperture size of modulators 10*a*–10*g*. Such series of elements may be eliminated—the function of reconstitution may be accomplished simply by introduction of component pulses into the transmission line. Alternatively, the function may be served by elements 8, 5, and 4, respectively, by use of a mirror and separation means which may take the form of a Wollaston prism sensing a plane polarization rotation of 90° introduced by a light rotating such as a Pockels cell element not shown. In any event, modulated pulsed energy is introduced into transmission line 18; and it is ultimately extracted, for example, as pulse 19, here depicted as evidencing some broadening due to dispersion, whereupon it is introduced into a demultiplexing means schematically represented by a series of elements similar to those utilized for multiplexing—i.e., prism 20 resulting in wavelength-spread front 21; prism 22, resulting in collimated front 23; and echelon 24, resulting in quantizing of now extracted component pulses 25*a* and 25*c*–25*f* corresponding with original multiplexed component pulses of the 10*a*–10*g* series. Elements 26*a*–26*g* may be detectors, such as photomultipliers, or may be amplifiers including non-linear gates. All of elements 20–26 may be representative of a receiver or of a repeater. Depending upon function such combination of elements may be repeated at appropriate spacing in the transmission direction.

What is claimed is:

1. Optical communications system including first means for generating pulsed electromagnetic radiation having a substantial portion of its energy in the wavelength range of 500$\mu$m to 100 Angstrom units, second means for modulating such pulsed radiation, and third means for further processing such modulated information, characterized in that separation means is interposed between said first and said second means for separating pulses emanating from said first means into radiation units containing distinct and differing spectral portions, said portions herein designated as component pulses, in which said second means includes a plurality of elements each so arranged as to admit but a corresponding component pulse so that such component pulses may serve as communications subcarriers and in which said third means includes means for reconstituting said component pulses after passage through said second means so producing a reconstituted pulse.

2. System of claim 1 in which said third means includes a transmission line and in which reconstitution results from simultaneously introducing component pulses into such line.

3. System of claim 1 in which said third means includes at least one demultiplexing apparatus for separating the said reconstituted pulse into portions corresponding in center frequency with the said component pulses.

4. System of claim 3 in which said demultiplexing apparatus is at least a portion of a receiver and in which it is provided with detection means, so placed and of such aperture as to be exclusively sensitive to such demultiplexed portions.

5. System of claim 4 in which the said detectors convert the said portions into electrical impulses.

6. System of claim 3 in which the said demultiplexing apparatus is at least a portion of a repeater and in which there is provided apparatus for reconstituting demultiplexed portions so as to produce a further reconstituted pulse for launching in a transmission medium.

7. System of claim 1 in which said first means includes a Q-switched laser.

8. System of claim 1 in which said first means includes a mode-locked laser.

9. System of claim 8 in which said first means includes a dispersive medium for time spreading pulsed energy produced by said mode-locked laser.

10. System of claim 1 in which said first means includes a cw laser and shutter means for interrupting a cw beam produced thereby so as to result in a stream of pulses.

11. System of claim 1 in which said second means comprises at least one prism for producing a diverging wave front characterized by a variation in wavelength from one geometric position to another.

12. System of claim 11 in which said second means additionally includes a collimating device following the said spreading means.

13. System of claim 1 in which said second means includes a grating.

* * * * *